(12) United States Patent
Acharya et al.

(10) Patent No.: US 9,516,087 B2
(45) Date of Patent: Dec. 6, 2016

(54) MANAGING DATA TRANSFER USING STREAMING PROTOCOLS

(71) Applicant: Amazon Technologies, Inc., Reno, NV (US)

(72) Inventors: Prashanth A. Acharya, Bellevue, WA (US); Jonathan B. Corley, Seattle, WA (US); Craig W. Howard, Seattle, WA (US); Harvo R. Jones, Seattle, WA (US); John K. Loendorf, Mercer Island, WA (US); Colm MacCarthaigh, Seattle, WA (US); Bradley E. Marshall, Bainbridge Island, WA (US); Imran S. Patel, Bellevue, WA (US); Lee B. Rosen, Seattle, WA (US); Ronald James Snyder, Jr., Everett, WA (US); Ryan F. Watson, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/558,532

(22) Filed: Dec. 2, 2014

(65) Prior Publication Data

US 2015/0089077 A1   Mar. 26, 2015

Related U.S. Application Data

(63) Continuation of application No. 13/420,357, filed on Mar. 14, 2012, now Pat. No. 8,924,581.

(51) Int. Cl.
 *H04L 29/06* (2006.01)
 *H04L 29/08* (2006.01)
(52) U.S. Cl.
 CPC ......... *H04L 65/608* (2013.01); *H04L 65/4084* (2013.01); *H04L 67/02* (2013.01); *H04L 69/18* (2013.01)

(58) Field of Classification Search
 CPC .... H04L 65/608; H04L 65/4084; H04L 67/02; H04L 69/18
 See application file for complete search history.

(56) References Cited

U.S. PATENT DOCUMENTS 6,182,125 B1 * 1/2001 Borella ............ G06F 17/30905
 370/234
6,212,640 B1 * 4/2001 Abdelnur ................ H04L 29/06
 726/2

(Continued)

OTHER PUBLICATIONS

"SPDY: An experiment protocol for a faster web," retrieved on Feb. 3, 2012, from http://www.chromium.org/spdy/spdy-whitepaper, 5 pages.

(Continued)

*Primary Examiner* — Uzma Alam
(74) *Attorney, Agent, or Firm* — Seed IP Law Group LLP

(57) ABSTRACT

Techniques are described for managing data transmissions between computing systems based at least in part on using a streaming transport protocol. At least some such data transmissions may be performed using HTTP, with one or more underlying transport protocols used to implement the HTTP-based data transmissions. HTTP-based data transmissions performed using an underlying streaming transport protocol, for example, may send data without performing error detection for reliability and without ensuring ordered delivery of the sent data. In addition, one or more HTTP-based data transmissions may be initiated using an underlying streaming transport protocol, but subsequent data transmissions may switch to using a different underlying transport protocol (e.g., TCP) or different transmission technique that is performed without using data streaming.

22 Claims, 6 Drawing Sheets

(56) References Cited

U.S. PATENT DOCUMENTS

| | | | | |
|---|---|---|---|---|
| 6,480,894 | B1* | 11/2002 | Courts | G06F 17/3089 |
| | | | | 707/E17.116 |
| 6,674,541 | B1* | 1/2004 | Kamiyama | H04L 29/12009 |
| | | | | 358/1.15 |
| 6,684,087 | B1* | 1/2004 | Yu | G06T 3/4038 |
| | | | | 455/414.3 |
| 7,225,237 | B1* | 5/2007 | Tenereillo | H04L 29/12783 |
| | | | | 370/392 |
| 7,313,134 | B2* | 12/2007 | Yarlagadda | H04L 29/06027 |
| | | | | 370/352 |
| 7,664,833 | B2* | 2/2010 | Shoolman | H04L 67/1027 |
| | | | | 709/219 |
| 7,720,983 | B2* | 5/2010 | Klemets | H04L 29/06027 |
| | | | | 370/231 |
| 8,135,031 | B2* | 3/2012 | Vimpari | H04L 29/06027 |
| | | | | 370/400 |
| 8,286,076 | B1* | 10/2012 | Szewczyk | G06F 9/4443 |
| | | | | 715/241 |
| 8,301,982 | B2* | 10/2012 | Ver Steeg | H04N 21/6437 |
| | | | | 714/776 |
| 8,904,470 | B2* | 12/2014 | Meuninck | H04N 7/17336 |
| | | | | 709/226 |
| 2003/0005129 | A1* | 1/2003 | Scheinkman | G06F 9/542 |
| | | | | 709/227 |
| 2003/0167432 | A1* | 9/2003 | Zhang | H04L 1/0009 |
| | | | | 714/747 |
| 2005/0080919 | A1* | 4/2005 | Li | H04L 69/16 |
| | | | | 709/236 |
| 2005/0166193 | A1* | 7/2005 | Smith | G06F 8/75 |
| | | | | 717/143 |
| 2005/0198268 | A1* | 9/2005 | Chandra | G06F 17/30864 |
| | | | | 709/224 |
| 2005/0272454 | A1* | 12/2005 | Hiller | H04W 4/16 |
| | | | | 455/518 |
| 2006/0168260 | A1* | 7/2006 | Hinde | H04L 63/029 |
| | | | | 709/229 |
| 2008/0081560 | A1* | 4/2008 | Jougit | H04W 48/10 |
| | | | | 455/41.2 |
| 2008/0281900 | A1* | 11/2008 | Boulia | H04L 63/029 |
| | | | | 709/201 |
| 2009/0172192 | A1* | 7/2009 | Christian | H04L 29/12132 |
| | | | | 709/242 |
| 2010/0082979 | A1* | 4/2010 | Edwards | H04L 63/0428 |
| | | | | 713/168 |
| 2010/0235441 | A1* | 9/2010 | Christian | H04L 29/12132 |
| | | | | 709/203 |
| 2011/0029682 | A1* | 2/2011 | Waters | H04L 12/4633 |
| | | | | 709/230 |
| 2011/0252152 | A1* | 10/2011 | Sherry | H04L 67/02 |
| | | | | 709/228 |
| 2011/0255529 | A1* | 10/2011 | Jalkanen | H04M 7/1225 |
| | | | | 370/352 |
| 2012/0005364 | A1* | 1/2012 | Ma | G06Q 30/0241 |
| | | | | 709/231 |
| 2012/0110167 | A1* | 5/2012 | Joch | H04L 65/80 |
| | | | | 709/224 |
| 2012/0113990 | A1* | 5/2012 | Sharma | H04L 12/66 |
| | | | | 370/392 |
| 2012/0117225 | A1* | 5/2012 | Kordasiewicz | H04L 65/1083 |
| | | | | 709/224 |
| 2012/0140701 | A1* | 6/2012 | Huang | H04W 84/047 |
| | | | | 370/315 |
| 2012/0140776 | A1* | 6/2012 | Hirota | H04J 3/1617 |
| | | | | 370/465 |
| 2012/0151520 | A1* | 6/2012 | Bassali | H04N 21/23424 |
| | | | | 725/32 |
| 2012/0254460 | A1* | 10/2012 | Ye | H04L 67/141 |
| | | | | 709/237 |
| 2012/0303833 | A1* | 11/2012 | Bao | H04N 21/233 |
| | | | | 709/231 |
| 2012/0311126 | A1* | 12/2012 | Jadallah | H04L 41/5067 |
| | | | | 709/224 |
| 2013/0003750 | A1* | 1/2013 | Vadlakonda | H04L 41/14 |
| | | | | 370/401 |
| 2013/0031263 | A1* | 1/2013 | Cradick | H04L 69/18 |
| | | | | 709/230 |
| 2013/0036234 | A1* | 2/2013 | Pazos | H04L 12/189 |
| | | | | 709/231 |
| 2013/0061259 | A1* | 3/2013 | Raman | H04H 60/32 |
| | | | | 725/14 |
| 2013/0080501 | A1* | 3/2013 | Wen | H04L 69/08 |
| | | | | 709/203 |
| 2013/0086142 | A1* | 4/2013 | Hampel | H04L 67/148 |
| | | | | 709/203 |
| 2013/0100810 | A1* | 4/2013 | Slothouber | H04L 43/0882 |
| | | | | 370/235 |
| 2013/0103791 | A1* | 4/2013 | Gottdenker | H04L 67/02 |
| | | | | 709/217 |
| 2013/0124669 | A1* | 5/2013 | Anderson | G06F 11/3006 |
| | | | | 709/217 |
| 2013/0124699 | A1* | 5/2013 | Jung | H04L 65/608 |
| | | | | 709/219 |
| 2013/0133068 | A1* | 5/2013 | Jiang | G06F 9/45533 |
| | | | | 726/23 |
| 2013/0170471 | A1* | 7/2013 | Nix | H04W 36/00 |
| | | | | 370/331 |
| 2013/0198763 | A1* | 8/2013 | Kunze | G06F 8/60 |
| | | | | 719/318 |
| 2013/0212166 | A1* | 8/2013 | Willig | H04L 65/1016 |
| | | | | 709/203 |
| 2013/0286868 | A1* | 10/2013 | Oyman | H04W 24/06 |
| | | | | 370/252 |
| 2014/0149557 | A1* | 5/2014 | Lohmar | H04L 65/605 |
| | | | | 709/219 |
| 2015/0288530 | A1* | 10/2015 | Oyman | H04W 56/00 |
| | | | | 370/312 |

OTHER PUBLICATIONS

"Adaptive bitrate streaming," retrieved on Mar. 14, 2012, from http://en.wikipedia.org/wiki/Adaptive_bitrate_streaming, 5 pages.
"Dynamic Adaptive Streaming over HTTP," retrieved on Feb. 2, 2012, from http://en.wikipedia.org/wiki/Dynamic_Adaptive_Streaming_over_HTTP, 1 page.
"HTTP Live Streaming," retrieved on Mar. 14, 2012, from http://en.wikipedia.org/wiki/HTTP_Live_Streaming, 4 pages.
"Real Time Messaging Protocol," retrieved on Mar. 14, 2012, from http://en.wikipedia.org/wiki/Real_Time_Messaging_Protocol, 9 pages.
"Real Time Streaming Protocol," retrieved on Mar. 14, 2012, from http://en.wikipedia.org/wiki/Real_Time_Streaming_Protocol, 5 pages.
"Real-time Transport Protocol," retrieved on Mar. 14, 2012, from http://en.wikipedia.org/wiki/Real-time_Transport_Protocol, 6 pages.
"RTP Control Protocol," retrieved on Mar. 14, 2012, from http://en.wikipedia.org/wiki/RTP_Control_Protocol, 4 pages.
"SPDY," retrieved on Mar. 14, 2012, from http://en.wikipedia.org/wiki/SPDY, 3 pages.
"Stream Control Transmission Protocol," retrieved on Mar. 14, 2012, from http://en.wikipedia.org/wiki/Stream_Control_Transmission_Protocol, 5 pages.
"Streaming media," retrieved on Mar. 14, 2012, from http://en.wikipedia.org/wiki/Streaming_media, 6 pages.
Heidemann et al., "Modeling the Performance of HTTP Over Several Transport Protocols," IEEE/ACM Transactions on Networking, vol. 5, No. 5, Oct. 1997, pp. 616-630.
Cohen et al., "Managing TCP connections under persistent HTTP," *Computer Networks* 31(11):1709-1723, 1999.

\* cited by examiner

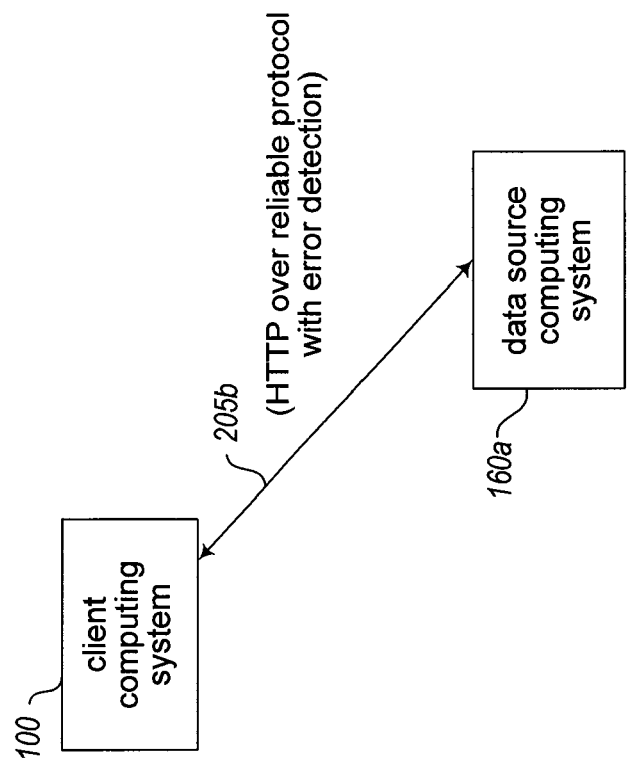

MANAGING DATA TRANSFER USING STREAMING PROTOCOLS

BACKGROUND

As the amount of data that is used by software programs on client systems has grown, various techniques have been used to transfer different types of data between systems in different manners, such as to transfer digital media content (e.g., images, videos, etc.) using various streaming networking protocols, and to transfer Web pages and files using various non-streaming networking protocols. However, various problems exist with such techniques.

BRIEF DESCRIPTION OF THE DRAWINGS

FIGS. 2A-2B illustrate examples of managing data transmissions based at least in part on using a streaming transport protocol, such as for HTTP-based data transmissions.

DETAILED DESCRIPTION

Figure 1:
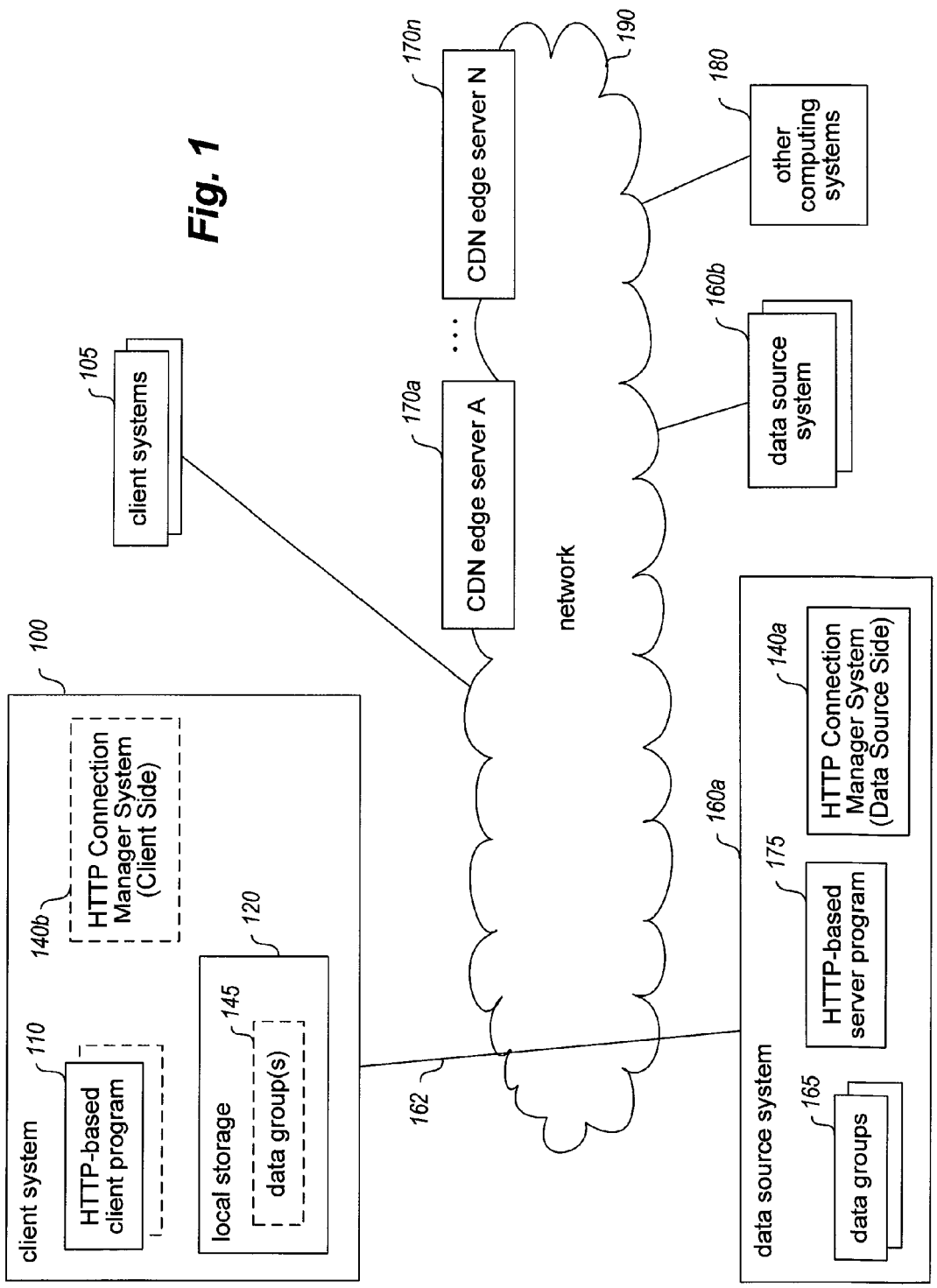
FIG. 1 illustrates an example embodiment of a connection manager system that manages data transmissions between data source systems and client computing systems based at least in part on using a streaming transport protocol.

Techniques are described for managing data transmissions between computing systems based at least in part on using a streaming transport protocol. In at least some embodiments, the data transmissions are performed using the HyperText Transport Protocol ("HTTP") application layer networking protocol, with one or more underlying transport networking protocols used to implement the HTTP-based data transmissions. As one illustrative example, in at least some situations, one or more HTTP-based data transmissions are performed using an underlying streaming transport protocol, such as to send data for the data transmissions without performing error detection for reliability and without ensuring ordered delivery of the sent data. In addition, in particular situations, one or more HTTP-based data transmissions may be initiated using an underlying streaming transport protocol, but subsequent data transmissions may be switched to using a different underlying transport protocol (e.g., TCP, or Transmission Control Protocol) or different transmission technique without using data streaming, such as if the initial data streaming using the underlying streaming protocol fails to satisfy one or more defined criteria (e.g., with respect to one or more of latency, error rate, available bandwidth, etc.). Additional details are included below related to the described techniques, and at least some of the described techniques are performed by automated operations of a connection manager system in some embodiments, such as for a connection manager system that is configured to support operations of one or more affiliated client computing systems and/or to support operations of one or more affiliated data source systems.

Thus, as noted above, the HTTP application layer protocol may be used in conjunction with the described techniques in at least some embodiments for data transmissions being performed. In other embodiments and situations, other application layer protocols may be used in conjunction with the described techniques, with a non-exclusive list of examples of other application layer protocols including the following: the SPDY protocol; FTP ("File Transfer Protocol"); RTSP ("Real Time Streaming Protocol"); RTP ("Real-time Transport Protocol"); RTCP ("RIP Control Protocol"); SIP ("Session Initiation Protocol"); etc. In addition, various transport layer protocols may be used in various embodiments and situations as underlying protocols for use with other application layer protocols, including the following non-exclusive list: TCP; UDP ("User Datagram Protocol"); SCTP ("Stream Control Transmission Protocol"); etc.—for example, underlying streaming transport protocols may include SCTP or UDP, such as to stream data without using connection-oriented data transmissions (e.g., using UDP), without performing error detection for reliable transmissions (e.g., using UDP or SCTP), without ensuring ordered delivery of data (e.g., using UDP or SCTP), etc. In addition, the data groups that are requested and transmitted may have various forms in various embodiments, with non-illustrative examples of such data groups including particular files (e.g., digital media content files that include audio and/or video data), Web pages, data elements within a Web page (e.g., a frame, image, etc.), data objects, database rows or other records, etc.

In addition, an embodiment of the connection manager system may select to use particular application layer networking protocols and/or underlying transport layer protocols in various manners in various embodiments. As one example, a connection manager system embodiment may be configured to attempt to use HTTP and an underlying streaming protocol when possible, such as until or unless problems occur (e.g., one or more defined streaming-related criteria are determined to not be satisfied)—if such problems occur, the connection manager system embodiment may further be configured to change to a different application layer protocol and/or underlying transport layer protocol for future data transmissions and/or for a continuing data transmission that is in progress (e.g., for a remaining portion of the continuing data transmission), such as to perform such further transmissions of data without using data streaming. In other situations, a particular connection manager system embodiment may be configured or instructed to perform data transmissions in particular manners for particular client systems (e.g., based on capabilities of a client system, based on characteristics of a connection and/or underlying transmission links between a data source system and a client system, etc.) and/or for particular data groups (e.g., based on a size of a data group, type of content of a data group, etc.), including based on a received request or prior configuration activities. In addition, a connection manager system embodiment may in some situations monitor transmission characteristics (e.g., latency, error rate, available bandwidth, etc.) of one or more data transmissions or connections or underlying transmission links, or otherwise obtain information about such transmission characteristics from one or more other systems, such as to enable determinations of when to switch or otherwise using particular networking protocols and transmission techniques based at least in part on such transmission characteristics.

In some embodiments, an application layer protocol may be used that is a page-based algorithm, such as to support transmission of multiple data groups that are part of a Web page or other aggregation of data, such as with each data group having a distinct URL (Uniform Resource Locator) or other reference. In such embodiments, the page-based algorithm may enable issuing multiple concurrent requests (e.g., HTTP Get requests) that correspond to the multiple data groups, and then using an underlying streaming protocol to concurrently send responses (e.g., HTTP-based responses to some or all such requests, such as via one or more connections that are established between one or more data source systems and client systems). An embodiment of the connection manager system may be configured to support such a page-based algorithm in various manners, including by supporting the issuance of concurrent requests, by supporting multiple concurrent responses to multiple requests, by interleaving response data for different responses on a single connection, etc.

In some situations, a content delivery network ("CDN") may include multiple edge server devices that are located in different portions of one or more networks, and are able to each cache various data for use by clients that are near the edge server device or otherwise associated with the edge server device. If so, a particular edge server device may be selected and loaded with particular data groups for a particular client system in at least some embodiments and situations, and a connection manager system associated with one or more such edge server devices may perform some or all of the described techniques when providing data to client systems from those edge server devices. Thus, in at least some embodiments, an embodiment of the connection manager system that is performing some or all of the described techniques may be part of or otherwise affiliated with a particular content delivery network, such as to enhance operation of the content delivery network in providing data groups to client computing systems. Non-exclusive examples of content delivery networks include Akamai Technologies, Amazon CloudFront, BitTorrent, CloudFlare, Limelight Networks, PeerCast, etc., and can be provided using various content networking technologies.

The use of the described techniques may provide various benefits in various embodiments and situations, including to provide faster access of a client system to particular data groups, optionally while also maintaining at least minimum data transmission capabilities in accordance with one or more defined criteria. Additional benefits are discussed elsewhere herein.

For illustrative purposes, some embodiments are described below in which specific instances of data transmissions are performed in specific ways, including with respect to specific types of client systems, specific types of data, and specific types of networking protocols. These examples are provided for illustrative purposes and are simplified for the sake of brevity, and the inventive techniques can be used in a wide variety of other situations, some of which are discussed below, and the techniques are not limited to use with particular types of data, storage or other devices, computing systems or computing system arrangements.

FIG. 1 is a network diagram that illustrates an example embodiment of a connection manager system that manages transmission of data in accordance with one or more application layer networking protocols that are implemented using one or more underlying transport layer network protocols, including in at least some situations to use streaming protocols. In particular, in the illustrated embodiment, an HTTP-based connection manager system 140 is illustrated, and it performs automated operations to support the transmission of data from a data source system 160a to various client systems over one or more networks 190. In addition, various CDN ("content delivery network") edge server devices 170a-170n are also optionally located at various locations within the network 190 to assist in providing at least some data to some client systems, and one or more other computing systems 180 are also illustrated and may be configured to provide various additional types of functionality (e.g., to manage operations of the optional content delivery network, to configure operations of the connection manager system 140, etc.).

In the illustrated example, a data source system 160a is executing an HTTP-based server program 175 to serve various stored data groups 165 to client systems—for example, the server program 175 may be a Web server program that uses data groups 165 to provide Web pages or other HTTP-based data to various client computing systems. The data source system 160a further is executing a portion 140a of the connection manager system 140 in this example to support operations of the data source system 160a in providing data groups to client systems 100 and 105, and in particular to manage transmission of data—in some embodiments, some or all of the functionality of the connection manager system portion 140a may instead be integrated within the program 175 (or within one or more other programs executing on the data source system 160a). Thus, the connection manager system 140 in this example includes at least a portion 140a that supports operations of data source system 160a, and optionally may include one or more additional portions 140b that support operations of various client systems. In a similar manner, one or more other data source systems 160b may be present and may each similarly execute a connection manager system portion 140a, although such additional connection manager systems 140a are not illustrated in this example. In other embodiments, a single connection manager system 140a may instead operate separately from the data source systems 160, such as to be executed on one or more separate computing systems (e.g., other computing systems 180), and optionally to support multiple such data source systems 160.

In the illustrated example, the client system 100 is executing an HTTP-based client program 110 (e.g., an HTTP-based Web browser program), and further in this example includes one or more local storage devices that provide local storage 120 for the client system 100, with one or more data groups 145 optionally being stored in the local storage 120 for use by the client system 100 in this example. In addition, the client system 100 in this example is optionally executing a portion 140b of the HTTP-based connection manager system, such as to interact with and cooperatively support operations of the connection manager system 140a executing on one or more data source systems 160. In other embodiments, functionality of the connection manager system portion 140b may instead be integrated as part of another program, such as the HTTP-based client program 110, or instead may not be used. It will be appreciated that the client computing system 100 may include various other components that are not illustrated in FIG. 1 for the sake of brevity, such as one or more hardware processors, as discussed in greater detail with respect to FIG. 3 and elsewhere.

In the illustrated embodiment, the client program 110 of the client system 100 may initiate one or more HTTP-based requests (e.g., one or more HTTP GET requests) to the data source system 160a for one or more of the stored data groups 165, such as by performing one or more interactions 162 with the server program 175 over the network(s) 190. In response to the received HTTP-based request(s), the connection manager system portion 140a determines how to perform the transmission of the requested data groups in response to the request, and may optionally further manage the transmission of the requested data, or instead the server program 175 may manage the transmission of the requested data as directed by the system 140*a* (e.g., by using an application layer protocol, transport layer protocol and/or transmission technique selected by the system 140*a*, such as to control whether the requested data is transmitted using data streaming or without using data streaming).

As one example, the connection manager system 140*a* may be configured to attempt to provide one or more HTTP-based responses using a specified streaming protocol by default, such as unless other instructions are received and/or any specified streaming-related criteria are not satisfied—if so, the system 140*a* may initiate the response(s) accordingly. In other embodiments, the system 140*a* may determine a particular underlying transport protocol and/or transmission technique to use based on one or more of a variety of factors, such as based on the particular client system 100, the particular data groups 165 requested, transmission characteristics of one or more underlying transmission links through the network 190 via which the requested data will be transmitted, based on an explicit request from the client system 100, based on prior configuration information, etc. In some embodiments, information about the data being transmitted via the interactions 162 may be monitored in order to determine whether one or more streaming-related criteria are satisfied based on determined transmission characteristics, such as to support a minimum network latency and/or error rate and/or network bandwidth—if so, the system 140*a* may perform such monitoring and make such a determination before the transmission of the requested data begins in some embodiments and situations, while in other embodiments and situations, the system 140*a* may continue to monitor the transmission of the requested data after it has begun in order to determine whether to modify that data transmission while it occurs and/or to modify future data transmissions. In addition, the system 140*a* may in some embodiments use adaptive bitrate streaming techniques in order to alter how the data transmission occurs to reflect the actual characteristics of the data transmissions that are occurring. Furthermore, whether in addition to or instead of the use of adaptive bitrate streaming, the system 140*a* may determine to modify the underlying transport protocol in use while the data transmission is occurring, and if so may transmit a first portion of the requested data using data streaming (e.g., based on a first underlying transport protocol that is a streaming protocol), and may transmit a second portion of the requested data without using data streaming (e.g., using a different second underlying transport protocol, such as a reliable session-based transport protocol such as TCP). The second portion of the requested data may include, for example, one or more HTTP-based responses that are different from one or more other HTTP-based responses send in the first portion of the requested data, and/or may include a re-transmission of one or more HTTP-based responses sent in the first portion. Moreover, in some embodiments and situations, such changes in an underlying transport protocol being used may occur more than once during the transmission of a particular group of requested data, such that a third or more portions of the requested data may be transmitted using a third or more different underlying transport protocols.

The connection manager system 140*a* may include software instructions to execute on one or more server computing systems to program or otherwise configure the server computing system(s) to perform some or all of the described techniques, such as to program one or more hardware CPU processors (not shown) of the server computing system(s). Similarly, the system 140*b* may include software instructions that execute on one or more client computing systems to program or otherwise configure the client computing system(s) to perform some or all of the described techniques, such as in cooperation with the system 140*a*, including by programming one or more hardware CPU processors (not shown) of the client computing system(s).

A particular data source system 160 may have various forms and may store various types of data in various embodiments. For example, a particular data source system 160 may be a server computing system that executes a Web server program (such as program 175) to provide access to Web pages and other data to support one or more Web sites. Alternatively, a particular data source system 160 may in some situations be a network storage device that stores data for access by other programs executing on other computing systems, such as to store various audio/video files that include digital media content, to store data in one or more databases, etc. In addition, CDN edge server devices and other types of devices (e.g., proxy servers) may similarly act as sources of data for other devices in some embodiments and situations. Thus, while not illustrated in this example, the optional CDN edge server devices 170 may each similarly include a copy of a connection manager system 140*a* to similarly support transmission of data from those edge server devices to various client computing systems, as may other systems that serve as sources of data.

Client computing systems may also have various forms in various embodiments, including desktop or other fixed-location computers, laptops and tablets and other mobile computers, smart phones and other cell phones, PDAs and other electronic organizers, Internet appliances, portable or fixed-location gaming systems, television-based systems (e.g., using set-top boxes and/or personal/digital video recorders), and various other consumer products that include appropriate communication capabilities. The use of particular data groups by a program 110 may also be initiated in various manners in various embodiments and situations. For example, in some cases an application program 110 may have one or more users (not shown), and may request data groups in response to user interactions with the program 110, including in situations in which the program 110 provides a publicly accessible service to such users. Such users may, for example, be local to the client system 100 (e.g., to interact with I/O devices, not shown, on the client system 100), and/or may be remote from the client system 100 (e.g., may use other computing systems 180 to interact with the program 110 over the network(s) 190). In addition, the network(s) 190 of FIG. 1 may also include any appropriate network or combination of networks, including an intranet, the Internet, one or more private networks with access to and/or from the Internet, a cellular network, a local area network, or any other such network or combination thereof. Communication over the networks may be enabled by wired or wireless connections and combinations thereof.

Although the foregoing example embodiment of FIG. 1 is described with respect to a connection manager system 140 that supports the HTTP application layer networking protocol, it will be appreciated that various other embodiments may exist. For example, in at least some embodiments and situations, the connection manager system 140 may support multiple application layer protocols that include HTTP and one or more other application layer protocols. Alternatively, in other embodiments the connection manager system 140 may support only one or more application layer protocols that do not include HTTP. In addition, in the illustrated embodiment, the client computing systems may each have one or more users, but it will be appreciated that a client system and/or a user may have various forms in various embodiments, including to represent an organization or other group (e.g., a company) with multiple people instead of an individual person.

In certain embodiments, the connection manager system may operate according to one or more fee-based structures or agreements. For example, access to some or all of the described techniques may in some embodiments be provided in a fee-based or other paid manner to a provider or operator of the system 140. As one example, clients who use functionality of the connection manager system 140 may pay one-time fees, periodic (e.g., monthly) fees and/or one or more types of usage-based fees to use functionality provided by the connection manager system, such as to a data source system that implements a portion 140a of the connection manager system. Fees may be based on one or more factors and activities, such as indicated in the following non-exclusive list: based on the quantity of data transferred, based on the number of data transfers (e.g., in a particular period of time), based on content or other characteristics of particular data groups that are transmitted, based on one or more other measures of the transfer of data (e.g., network bandwidth resources consumed, number of computing systems to or from which the data is transmitted, etc.), etc.

Figure 2A:
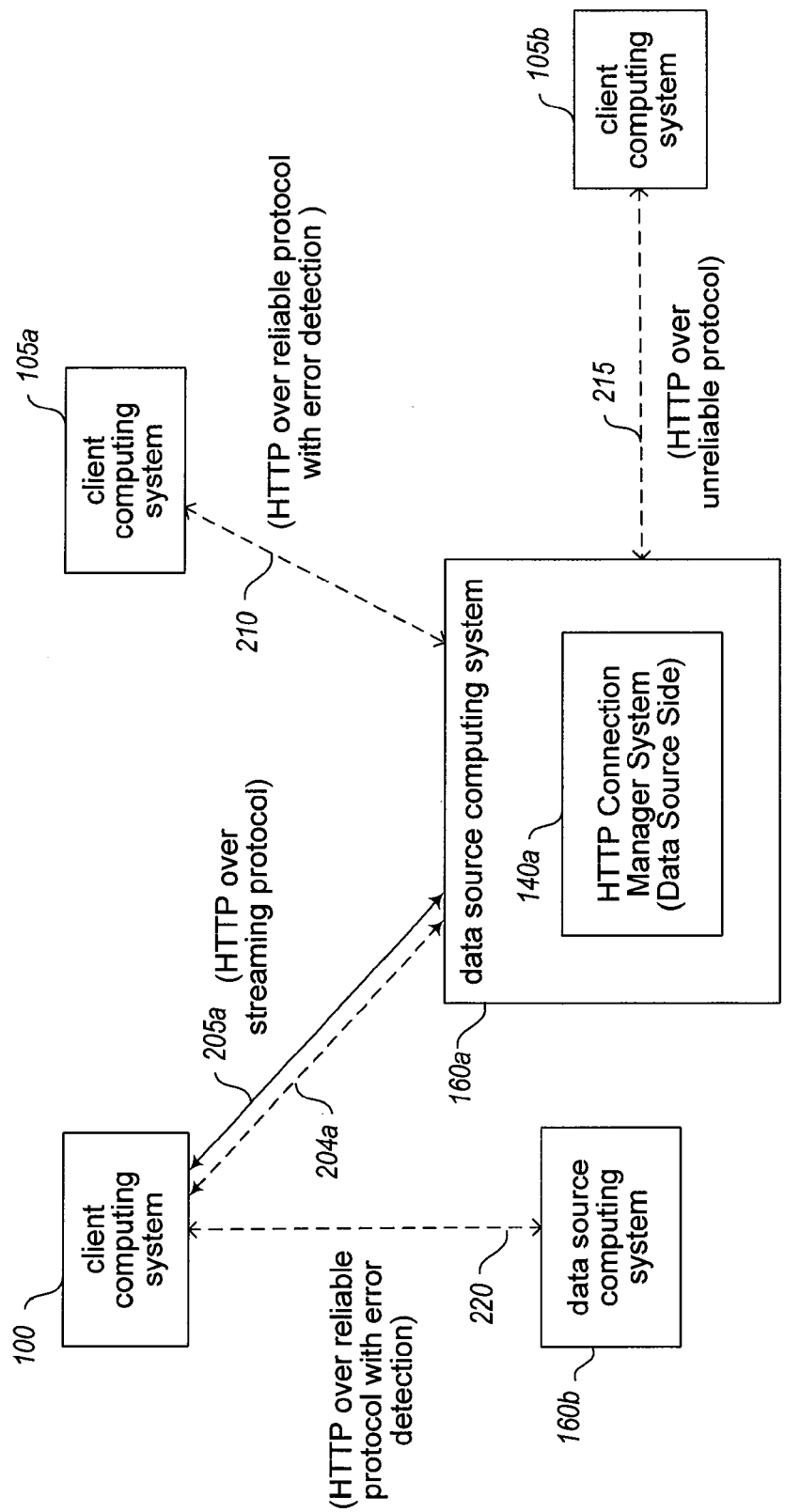

FIGS. 2A-2B illustrate examples of managing the transmission of data by an embodiment of the connection manager system in various manners in various situations. In particular, with respect to FIG. 2A, the figure illustrates some of the systems discussed with respect to FIG. 1, and provides additional details related to a particular example of use of those systems. Thus, in the example of FIG. 2A, the client computing system 100, the data source computing system 160a, multiple other client computing systems 105a and 105b, and another data source computing system 160b are illustrated, although some details of the client computing system 100 and the data source computing system 160a are not illustrated for the sake of brevity. In a similar manner, the one or more intervening networks 190 and optional content delivery network edge server devices are not illustrated in FIG. 2A for the sake of brevity.

In the example of FIG. 2A, the HTTP Connection Manager System (Data Source Side) system 140a of the data source computing system 160a manages the transmission of various data groups (not shown) to various client computing systems in various manners. For example, with respect to the interactions 162 illustrated in FIG. 1, the system 140a in FIG. 2A participates in the interactions 162 by performing one or more data transmissions over a data channel 205a to the client computing system 100 that are performed using the HTTP networking protocol over an underlying streaming protocol, in order to use data streaming for the data transmissions. While not illustrated in FIG. 2A, the client computing system 100 may optionally implement an HTTP Connection Manager System (Client Side) system 140b to manage interactions with the system 140a.

FIG. 2A further illustrates that the communications between the client computing system 100 and the data source computing system 160a may use multiple data channels in at least some embodiments and situations, such as an optional second data channel 204a in addition to the first data channel 205a. Such different data channels may, for example, use one or more of the following: different transport protocols, different ports, different physical transmission links, etc.

As a first example, the client computing system 100 may initiate one or more requests (e.g., HTTP Get requests) to the data source computing system 160a using a reliable data channel 204a, such as a data channel that is based on an underlying transport protocol that performs error detection for reliability and performs ordering of transmitted data (e.g., the TCP transport protocol). In such situations, at least one or more initial HTTP-based data transmissions that are sent in response to the request(s) may be transmitted over a different unreliable data channel 205a, such as a data channel that is based on an underlying transport protocol that does not perform error detection for reliability or ordering of transmitted data (e.g., the UDP transport protocol). In such embodiments, the data source computing system may also optionally initially use the reliable data channel to coordinate the subsequent transmission of the data using the unreliable data channel, such as by coordinating with an HTTP Connection Manager System (Client Side) system (not shown) that is executing on the client computing system.

As a second example, the client computing system 100 may initiate a first group of one or more requests (e.g., HTTP Get requests) to the data source computing system 160a using an unreliable data channel 205a, and may also initiate a second group of one or more requests (e.g., HTTP Get requests) to the data source computing system using a reliable data channel 204a, such as at substantially the same time, and optionally for the same or overlapping data groups. In such a situation, if some or all of the requests of the first group are successfully received by the data source computing system over the unreliable data channel, the transmission of those requests and the corresponding responses by the data source computing system may typically occur much more quickly than similar transmissions using the reliable data channel. Accordingly, if a sufficient quantity of the requests and corresponding responses are received by the client computing system using the unreliable data channel, the client computing system may be able to quickly initiate one or more actions using the received data (e.g., to display a corresponding Web page to a user of the client computing system) before any or a sufficient quantity of responses are received by the client computing system using the reliable data channel. Conversely, if a sufficient quantity of corresponding responses are not received by the client computing system using the unreliable data channel, the client computing system may instead wait to receive sufficient responses using the reliable data channel, and then perform one or more subsequent actions. In this manner, the client computing system is ensured to receive the requested data via at least the reliable data channel, but may be able to receive sufficient data much more quickly via the unreliable data channel.

A determination of whether sufficient response data has been received using an unreliable data channel may be made in various manners in various embodiments, such as in accordance with defined minimum threshold criteria (e.g., all requested data, a specified percentage or other subset of requested data, particular specified pieces of data that are a subset of all the requested data, etc.). As one example, multiple requests may be made for multiple data groups that together form a complete Web page, but it may be possible to display a more minimal version of that Web page with a subset of the data groups (e.g., without an image that corresponds to one of the data groups). Furthermore, if only a subset of the requested data is received using the unreliable data channel, the client computing system may in some embodiments and situations perform initial actions using that subset of data (e.g., to display a minimal version of a Web page), and then later perform additional actions using other data received using the reliable data channel (e.g., to modify the minimal version of the Web page to include some or all of the additional data groups to form the complete Web page)—such additional actions may, for example, be based on combining a first subset of data received using the unreliable channel with a second subset of data received using the reliable channel, or may instead include receiving all of the requested data using the reliable channel and using it to replace the subset of data received using the unreliable channel. Furthermore, if multiple data channels are used in a concurrent manner, in some embodiments additional feedback or control information may be exchanged between the client computing system and the data source computing system during transmission of data, such as to halt some or all transmissions of data using the reliable data channel if sufficient data is received using the unreliable data channel (e.g., to halt the transmission of successfully received data groups, to halt the transmission of all data groups, etc.), or to halt additional transmissions of data using the unreliable data channel (e.g., if sufficient data is not being received from the transmissions over the unreliable data channel).

When transmitting response data, the data source computing system may further perform operations to perform error encoding of at least some data being transmitted, such as for data being streamed using a streaming transport protocol. Such error encoding may introduce redundancy in the data being transmitted, such that some or all of the data being transmitted may be recovered or determined by the client computing system in situations in which portions of the transmitted data is not successfully received by the client computing system. As one example, the error encoding may include calculating and transmitting parity data, or more generally may include using erasure coding techniques or other techniques that transmit redundant data for reliability purposes. In situations in which such error encoding is used, an HTTP Connection Manager System (Client Side) system (not shown) or other software that is executing on the client computing system may use the error encoding to recover or otherwise determine at least some data that is not successfully received due to data loss from streaming of data. Such error encoding techniques may thus be used in various embodiments, including whether one or more data channels are used, as discussed above.

In the illustrated example of FIG. 2A, the system 140a further optionally manages other transmissions of data to other client computing systems in other manners. For example, the system 140a may initiate one or more data transmissions 210 to client computing system 105a that similarly use the HTTP networking protocol, but instead use an underlying selected reliable session-based transport protocol (e.g., TCP) to perform those data transmissions without data streaming. Similarly, the system 140a may initiate one or more data transmissions 215 to another client computing system 105b that again use the HTTP networking protocol, but in this example use an unreliable session-based transport protocol (e.g., UDP) to perform those data transmissions without data streaming. Thus, in this manner the system 140a may perform different data transmissions at various times using different underlying transport protocols, such as based on different data groups being transmitted, different client systems being interacted with, different transmission links being used for the data transmission (e.g., based on different transmission characteristics of those data transmissions), etc.

FIG. 2A further illustrates that a particular client computing system, such as client computing system 100, may receive different data transmissions using different underlying transport protocols, whether at the same time or at different times, and whether from the same data source computing system or a different data source computing system. In the example of FIG. 2A, another data source computing system 160b is illustrated that is performing one or more data transmissions 220 with the client computing system 100. In a manner similar to that of the data transmissions 210, the data source computing system 160b uses the HTTP networking protocol for the data transmissions 220, but with the HTTP-based data transmissions being implemented using an underlying reliable session-based transport protocol (e.g., TCP) to perform those data transmissions without data streaming. While not illustrated in FIG. 2A, the data source computing system 160b may similarly be executing a copy of the HTTP Connection Manager System (Data Source Side) system 140a, such as to manage the data transmissions 220.

In addition, in some embodiments the system 140a on the data source computing system 160a may manage only some data transmissions performed by the data source computing system 160a, such as if the system 140 manages the data transmissions 205a to the client computing system 100, but one or more other programs (not shown) executing on the data source computing system 160a instead manage one or both of the data transmissions 210 and 215. In other embodiments, the system 140a may instead support only a single underlying transport protocol, such as a streaming protocol, and/or may support multiple networking protocols, whether in addition to or instead of HTTP.

FIG. 2B continues the example of FIG. 2A, and includes some of the information that was illustrated in FIG. 2A. In particular, in the example of FIG. 2B, the client computing system 100 is again illustrated and is performing interactions with the data source computing system 160a, such as under the control of the HTTP. Connection Manager System (Data Source Side) system 140a. In the example of FIG. 2B, the data transmissions 205b between the computing systems 160a and 100 are a continuation of the same data transmissions 205a of FIG. 2A, such as at a later period of time after a first portion of the requested data has been transmitted, although in other embodiments may correspond to a different later data transmission of a different data group. In this example, the system 140a has performed a first portion of the data transmission using the HTTP networking protocol over an underlying streaming transport protocol, as described with respect to FIG. 2A. At the time illustrated in FIG. 2B, however, the system 140a has determined to modify a remaining portion of the data transmission so that it continues to use the HTTP networking protocol, but instead is using a different underlying transport protocol that has been selected by the system 140a. In particular, in the example of FIG. 2B, the underlying transport protocol has been changed to a reliable session-based protocol (e.g., TCP) in order to perform the remaining portion of data transmission without using data streaming. Thus, the data transmissions 205b may, for example, be performed using the reliable data channel 204a of FIG. 2A (not shown in FIG. 2B) and/or a different reliable data channel.

The change from the data transmission 205a operations to the data transmission 205b operations may be initiated by the system 140a for various reasons, such as based on monitoring the initial portion of the data transmission that occurred and determining that one or more streaming-related criteria are not satisfied based on the first portion of the data that is transmitted using the underlying streaming transport protocol (e.g., based on too many transmitted data packets or datagrams being lost or mis-ordered). While the other client computing systems and data source computing system of FIG. 2A are not illustrated in the example of FIG. 2B, one or more of those other illustrated data transmissions of FIG. 2A may similarly be modified during the data transmission, as discussed in greater detail elsewhere.

It will be appreciated that the examples of FIGS. 2A and 2B are provided for illustrative purposes, and that the invention is not limited by the details discussed with respect to these examples.

Figure 3:
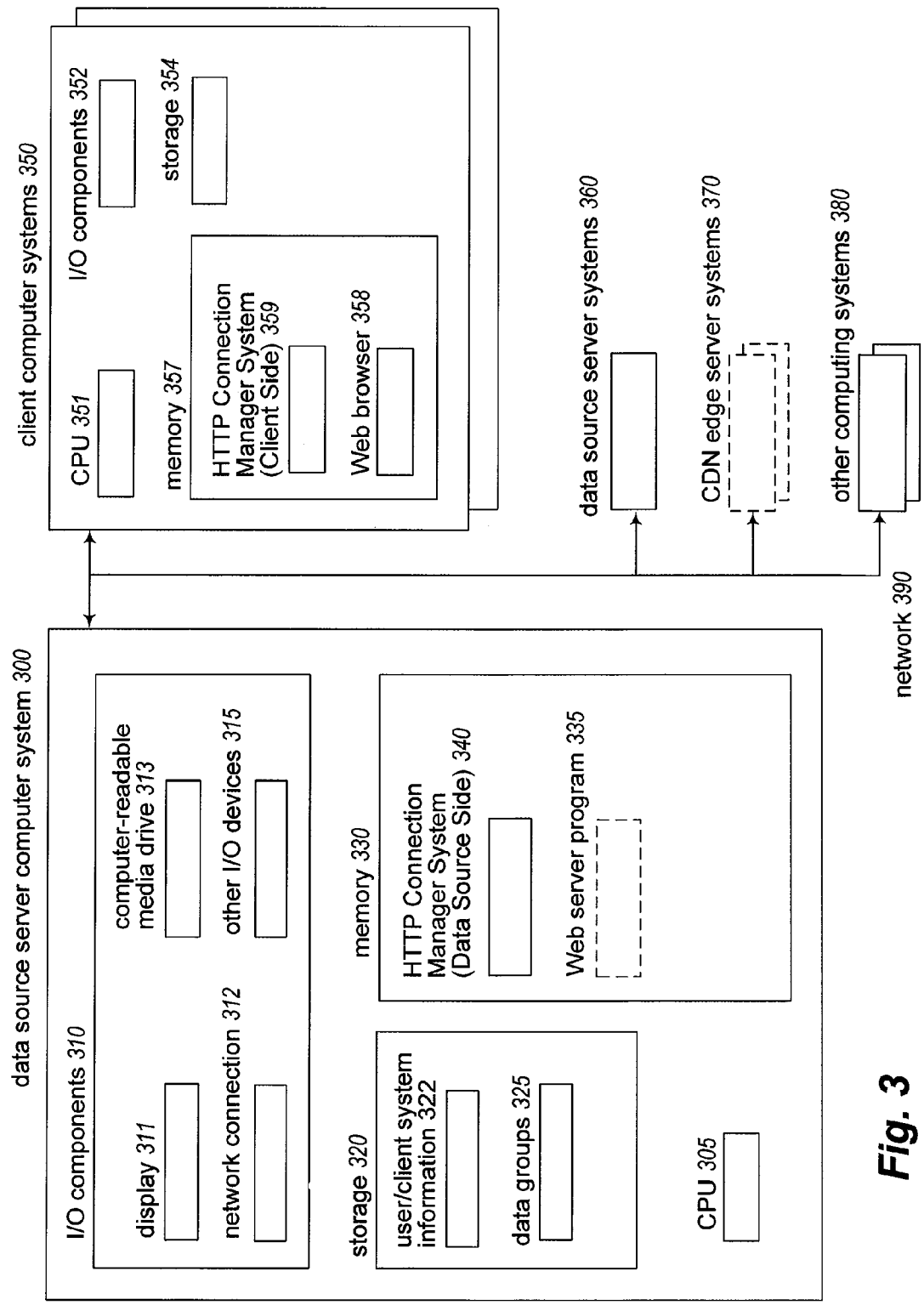
FIG. 3 is a block diagram illustrating an example embodiment of a computing system configured to provide a connection manager system that manages data transmissions between data source systems and client computing systems based at least in part on using a streaming transport protocol.

FIG. 3 is a block diagram illustrating an example embodiment of a computer system suitable for performing techniques to manage data transmissions based at least in part on using a streaming transport protocol, such as for HTTP-based data transmissions. In particular, FIG. 3 illustrates a data source server computer system 300 suitable for executing an embodiment of a connection manager system 340, as well as various computer systems 350, content data source systems 360, optionally edge server devices 370, and other computing systems 380. In the illustrated embodiment, the connection manager system 340 is an HTTP-based system, and corresponds to a data source side of the connection manager system, although in other embodiments the system 340 may support one or more other application layer protocols, whether instead of or in addition to HTTP. In addition, the computer system 300 in this example has components that include one or more hardware CPU processors 305, various I/O components 310, storage 320, and memory 330, with the illustrated I/O components including a display 311, a network connection 312, a computer-readable media drive 313, and other I/O devices 315 (e.g., a keyboard, a mouse, speakers, etc.). In other embodiments, the computer system 300 may have more or less components than are illustrated, and the local storage 320 may optionally be provided by one or more non-volatile storage devices that are included within or otherwise locally attached to the computer system 300.

In addition, the illustrated client computer systems 350 have components similar to those of computer system 300, including a CPU 351, I/O components 352 (although particular components are not illustrated), storage 354, and memory 357. The other data source systems 360, edge server systems 370, and other computing systems 380 may also each include similar components to some or all of the components illustrated with respect to computer system 300, but such components are not illustrated in this example for the sake of brevity. The client computer systems 350 each includes a browser program 358 executing in memory 357, and each optionally includes a client side portion 359 of the HTTP Connection Manager system, although in other embodiments one or both of these components may not be present on some or all client systems. Furthermore, a particular client computer system 350 may have more or less components than are illustrated, and the local storage 354 may optionally be provided by one or more non-volatile storage devices that are included within or otherwise locally attached to that client computer system 350. In a similar manner as that of system 340, a particular system 359 may in other embodiments support one or more application layer protocols other than HTTP, whether instead of or in addition to HTTP.

An embodiment of the data source side portion of a connection manager system 340 is executing in memory 330 of computer system 300, such as to include software instructions that, when executed by the CPU 305, program or otherwise configure the computer system 300 to perform automated operations to provide some or all of the described techniques. In addition, an application program 335 is executing in memory 330 (which in this example embodiment is a Web server program), optionally in affiliation with (or integrated with) the system 340, although in other embodiments the system 340 may support one or more software programs and/or systems over the network 390 (e.g., one or more data source systems 360 and/or one or more edge server devices 370), or instead the system 340 may operate independently of any such software programs and systems. In this example embodiment, the connection manager system 340 includes functionality related to managing data transmissions based at least in part on using a streaming transport protocol, such as for HTTP-based data transmissions, such as for data groups 325 on storage 320 and/or other data groups (not shown). The connection manager system 340 is further optionally configured to interact with client computer systems 350 and/or other systems and devices over the network 390 (e.g., via the Internet and/or the World Wide Web, via a private cellular network, etc.). The other systems 350, 360, 370 and/or 380 may also each be executing various software as part of interactions with the system 340, including for the system 359 in memory of a client computer system 350 to have software instructions that, when executed by the CPU 351 of that client system, program or otherwise configure the client system 350 to perform automated operations to provide some or all of the described techniques.

Various information related to the operation of the connection manager system 340 and/or application program 335 may be stored in storage 320, such as information 322 about particular client systems and/or users, and optionally particular data groups 325 that may be transmitted to particular client systems, such as in a manner similar to that described with respect to FIGS. 2A-2B and elsewhere. Additional details regarding operations of the system 340 in particular embodiments are described in greater detail elsewhere.

It will be appreciated that systems 300, 350, 360, 370 and 380 are merely illustrative and are not intended to limit the scope of embodiments of the present disclosure. For example, system 340 may instead be executed by multiple interacting computing systems or devices, and computing system 300 may be connected to other devices that are not illustrated, including through one or more networks such as the Internet, via the World Wide Web ("Web"), or other electronic communications network (e.g., cellular based network, public switched telephone network). More generally, a computer system or computing system or other device may comprise any combination of hardware that can interact and perform the described types of functionality, optionally when programmed or otherwise configured by particular corresponding software instructions, including without limitation desktop or other fixed-location computers, laptops and tablets and other mobile computers, database servers, network storage devices and other network devices, PDAs, smart phones and other cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated system 340 may in some embodiments be distributed in various modules.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computer systems via inter-computer communication. Thus, in some embodiments, some or all of the described techniques may be performed by hardware means that include one or more processors and/or memory and/or storage when configured by one or more software programs (e.g., by the system 340 and/or the system 359) and/or data structures (e.g., defined configuration information to control selection of particular transport layer protocols and/or application layer protocols in particular situations), such as by execution of software instructions of the one or more software programs and/or by storage of such software instructions and/or data structures. Furthermore, in some embodiments, some or all of the systems and/or modules may be implemented or provided in other manners, such as by using means (e.g., specialized electronics) that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on non-transitory computer-readable storage media, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
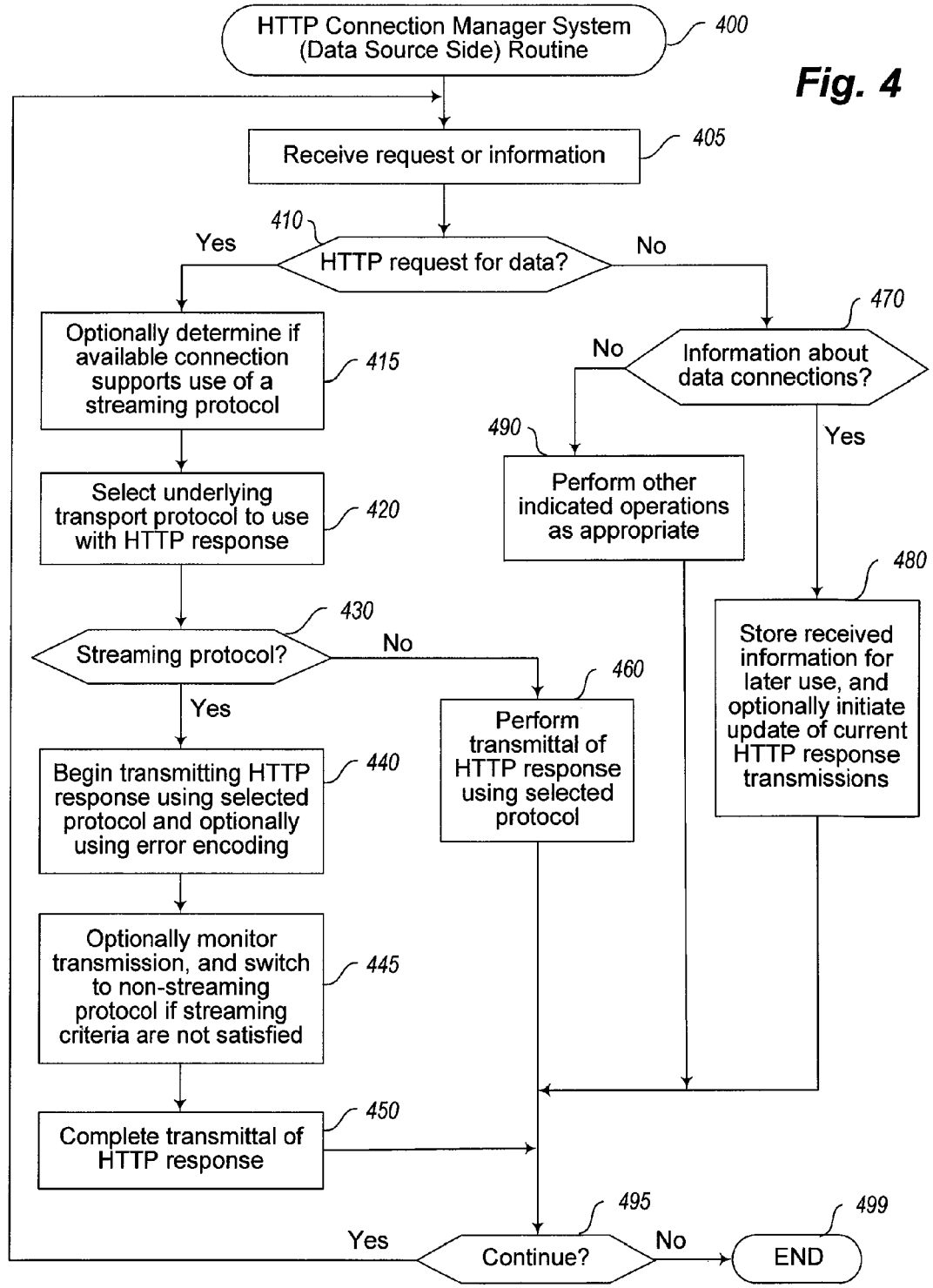
FIG. 4 illustrates an example embodiment of a flow diagram for an HTTP Connection Manager System (Data Source Side) routine.

FIG. 4 is a flow diagram of an example embodiment of an HTTP Connection Manager System (Data Source Side) routine 400. The routine may be provided by, for example, execution of the HTTP Connection Manager System (Data Source Side) system 140*a* of FIG. 1 and FIGS. 2A-2B, and/or the HTTP Connection Manager System (Data Source Side) system 340 of FIG. 3, such as to manage the transmission of HTTP response data transmissions and other data transmissions using one or more of various types of underlying transport protocols and transmission techniques. In this example embodiment, the routine provides HTTP-based responses (e.g., to HTTP Get requests) using underlying streaming protocols in at least some situations, although in other embodiments the routine may transmit other types of data that are not limited to HTTP-based responses. In addition, in some situations the routine may receive multiple related requests for multiple groups of data and may make multiple related responses, although the actions of the routine are illustrated in this embodiment for handling a single request and response at a time.

In the illustrated embodiment, the routine begins at block 405, where a request or other information is received. The routine continues to block 410 to determine if the request received in block 405 is an HTTP request for data. If so, the routine continues to block 415, where it optionally performs one or more actions to determine if an available connection to the requestor supports use of an underlying streaming protocol, such as in accordance with one or more defined streaming-related criteria. As discussed in greater detail elsewhere, such streaming-related criteria may, in some embodiments, be based on characteristics of communications over an available connection or underlying transmission link(s), such as with respect to network bandwidth and/or latency and/or error rate, while in other embodiments the determination of whether to use an underlying streaming protocol with respect to a particular requestor and/or connection may be made in other manners (e.g., based on previously supplied configuration information). Such transmission links may, for example, include one or more wires or circuits or wireless mediums over which data may be transmitted and data connections established. In addition, in at least some embodiments and situations, multiple data channels may be used, such as at least one reliable data channel and at least one unreliable data channel. As a first example, the HTTP request may be received using a reliable data channel, but at least some data transmissions that are performed in response may occur using an unreliable data channel, such as with respect to blocks 440 and possibly 450. As a second example, the HTTP request may be sent over both a reliable and unreliable channel, and one or both requests may be responded to if successfully received, or instead the second request may optionally be discarded if a response to the first request was already successfully performed (e.g., was successfully received by a client system to which it was transmitted). Thus, in some embodiments, the operations of block 415 may not be performed, such as if an underlying streaming protocol is attempted to be used for each HTTP response without performing such initial determination activities, if no connection exists, if no information is currently available about an available connection or underlying transmission link(s), etc.

After block 415, or if it is instead not performed, the routine continues to block 420 to select a particular underlying transport protocol to use with the HTTP response to be sent for the received request. As discussed in greater detail elsewhere, the selection of a particular underlying protocol to use may be performed in various manners in various embodiments, such as based at least in part on the determination made with respect to block 415 if it is performed, in accordance with previously specified configuration information (e.g., to always initially select the same underlying protocol, to select the underlying protocol based at least in part on the requestor and/or the requested data, etc.), in accordance with information included in the received request, etc. After block 420, the routine continues to block 430 to determine whether the selected underlying protocol is a streaming protocol. If not, the routine continues to block 460 to perform the transmittal of the HTTP response with the requested data using the selected non-streaming protocol. For example, if the selected underlying protocol is a connection-based transport protocol (e.g., TCP), the routine may establish a connection with the requestor, and perform the transmittal over the connection in a reliable manner that includes performing error checking and re-transmission of data packets as needed.

If it is instead determined in block 430 that the selected underlying protocol is a streaming protocol, the routine continues instead to block 440 to begin transmitting the HTTP response with the requested data using the selected protocol, including to optionally use error encoding or other techniques to transmit redundant data in at least some embodiments and situations. After block 440, the routine in some embodiments continues to block 445 to optionally monitor the ongoing transmission, such as to determine if the transmission using the streaming protocol satisfies any specified streaming-related criteria—such monitoring may in some embodiments be based at least in part on the application layer protocol and/or transport layer protocol in use, such as if a protocol in use includes a control channel or an associated control protocol (e.g., RTCP). If the monitoring is performed and the data transmission does not satisfy any such specified streaming-related criteria, the routine may further in block 445 determine to switch the transmission to a different non-streaming protocol and/or transmission technique, such as to use a default transport protocol for such situations (e.g., TCP), or to otherwise select a different transport protocol. After block 445, or if the actions in block 445 are not performed, the routine continues to block 450 to complete the transmittal of the HTTP-based response, using either the original selected streaming protocol in the manner described for block 440 (if not changed in block 445) or instead the changed non-streaming protocol (if changed in block 445). In at least some embodiments and situations in which the protocol is changed during transmission, some or all previously transmitted data using a prior transport protocol is not re-transmitted using the changed protocol, while in other embodiments and situations at least some such previously transmitted data may be re-transmitted using the changed protocol. In other embodiments, a change to a different application layer protocol and/or transport protocol may be made for future HTTP-based responses or related data transmissions based on measured characteristics of one or more data transmissions, but without modifying an ongoing HTTP-based response or related data transmission. In addition, while the illustrated embodiment of the routine does not include performing a switch during transmission of an HTTP response from a non-streaming protocol to a streaming protocol (e.g., with respect to block 460, or 450 if the protocol is changed in block 445), in other embodiments such changes may also be made when appropriate, including by monitoring the initial transmission of data using a non-streaming protocol and determining whether subsequent transmission may be performed using a streaming protocol in a manner that satisfies any specified streaming-related criteria.

If it is instead determined in block 410 that the request received in block 405 is not an HTTP request for data, the routine continues instead to block 470 to determine whether information has been received about one or more data connections, and if so continues to block 480 to store such received information for later use. For example, the information received may be monitoring information that corresponds to one or more data connections that are currently or previously used to transmit one or more HTTP-based responses, such as monitoring information that is supplied in response to previous monitoring requests made by the routine 400 (e.g., with respect to block 490), or instead may be sent to the routine 400 by one or more other modules or systems that perform such monitoring. If such monitored information is received that corresponds to a current transmission, the routine may optionally further initiate an update in block 480 of those current HTTP response transmittals if appropriate, such as to change from a streaming protocol to a non-streaming protocol in a manner similar to that previously discussed with block 445. In other situations, the information received may be configuration information that is supplied with respect to a particular client and/or data connection, such as to specify a type of underlying transport protocol to be selected and used in particular situations as indicated.

If it is instead determined in block 470 that the request or information received in block 405 is not information about data connections, the routine continues instead to block 490, where it performs one or more other indicated operations as appropriate. Such other indicated operations may have various forms in various embodiments and situations, including to perform periodic monitoring of particular data connections (e.g., by making requests to other systems to provide monitored data and/or to provide responses to sent messages, such as with respect to ping requests), to receive and respond to requests for data that are not performed using HTTP, to perform additional operations to group together multiple distinct HTTP requests that are related in one or more manners, such as that correspond to different portions of a particular Web page or other data aggregation in accordance with a page-based algorithm that is in use, etc.

After blocks 450, 460, or 480, the routine continues to block 495 to determine whether to continue, such as until an explicit indication to terminate is received. If it is determined to continue, the routine returns to block 405, and if not continues to block 499 and ends.

Figure 5:
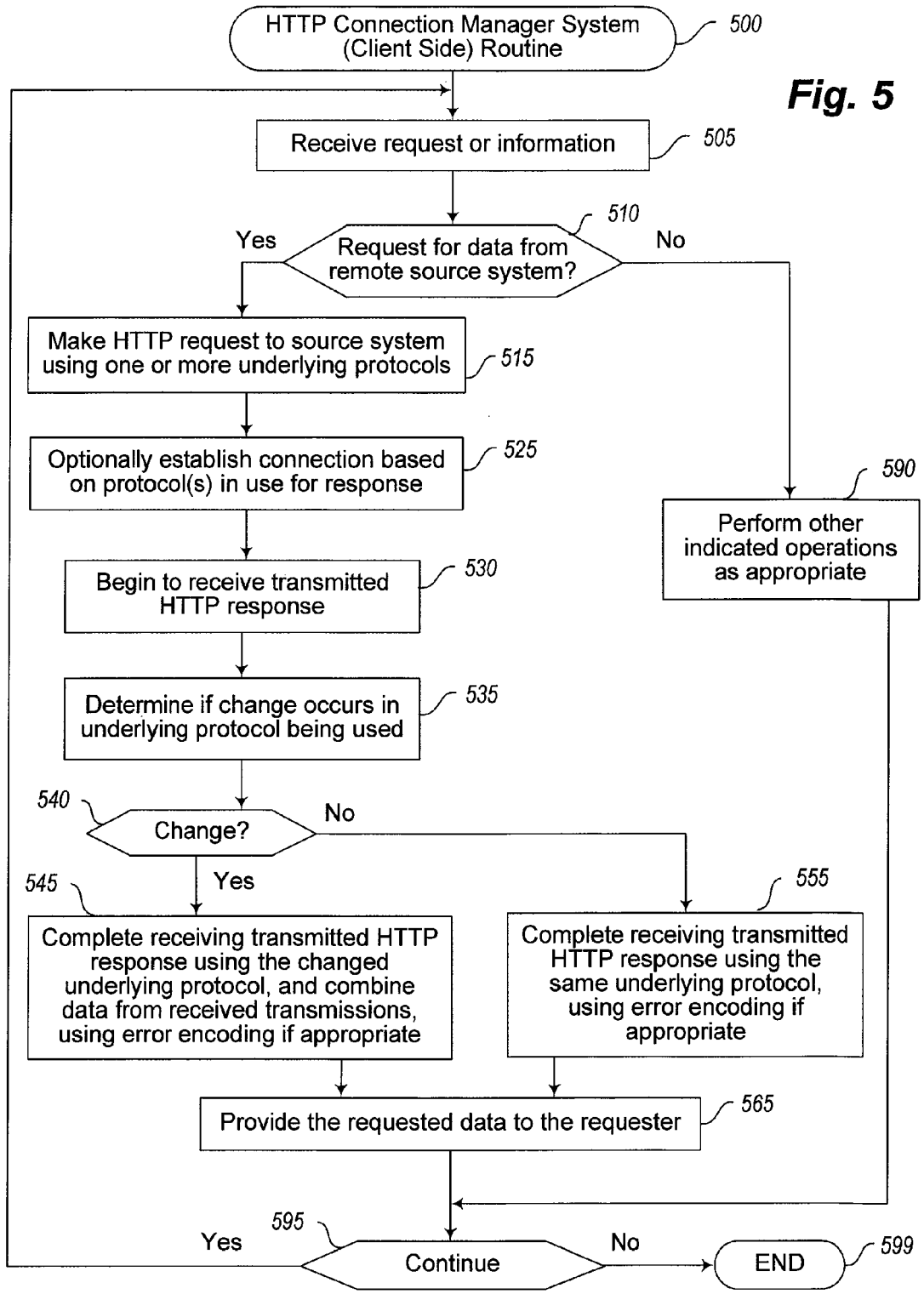
FIG. 5 illustrates an example embodiment of a flow diagram for an HTTP Connection Manager System (Client Side) routine.

FIG. 5 is a flow diagram of an example embodiment of an HTTP Connection Manager System (Client Side) routine 500. The routine may be provided by, for example, execution of the HTTP Connection Manager System (Client Side) system 140b of FIG. 1 and FIGS. 2A-2B, and/or the HTTP Connection Manager System (Client Side) system 359 of FIG. 3, such as to make HTTP-based requests for data from remote sources, and to manage the receipt of transmitted data using one or more underlying transport protocols (e.g., in a coordinated manner with a routine 400 for an HTTP Connection Manager System (Data Source Side) that coordinates the data transmission, such as based on interactions or related configuration). In this example embodiment, the requests and responses are made using HTTP, but in other embodiments other types of data and protocols may be used, as discussed in greater detail elsewhere. In addition, in some situations the routine may send multiple related requests for multiple groups of data and receive multiple related responses, although the actions of the routine are illustrated in this embodiment for handling a single request and response at a time.

The routine begins in block 505, where a request or information is received. The routine continues to block 510 to determine if a request is received for data that is available from a remote source system, such as based on a selection by a user of a client system on which the routine 500 executes (e.g., via an HTTP-based Web browser program executing on the client system), or instead in other manners (e.g., based on a request made by an executing program on such a client system).

If it is determined in block 510 that a request is received for data from a remote source system, the routine continues to block 515 to make an HTTP request to the remote source system. In some embodiments and situations, the request made in block 515 may further specify a particular underlying transport protocol to be used with the HTTP response, such as to request the use of a streaming protocol or the use of a non-streaming protocol. In addition, as described in greater detail elsewhere, multiple data channels may be used in at least some embodiments and situations, such as at least one reliable data channel and at least one unreliable data channel. As a first example, the HTTP request may be sent using a reliable data channel, but at least some data transmissions that are received in response may occur using an unreliable data channel. As a second example, the HTTP request may be sent over both a reliable and unreliable channel, and responses to one or both requests may be received. In block 525, the routine then optionally establishes a connection to use to receive the corresponding HTTP response, such as based on handshaking actions performed by the remote source system or other information received from the remote source system, in accordance with a connection-based underlying transport protocol that is selected to be used for the HTTP response to be provided. In block 530, the routine then begins to receive the transmitted HTTP response. After block 530, the routine in block 535 optionally may determine that a change has occurred during the transmittal of the HTTP response with respect to the underlying transport protocol that is being used for the HTTP response, such as based on actions taken by a particular remote source system as described with respect to block 445 of FIG. 4.

In block 540, the routine then determines whether a change has occurred in the underlying transport protocol being used for transmission of the HTTP-based response. If not, the routine continues to block 555 to complete the receiving of the transmitted HTTP response using the same underlying protocol that was used to begin the transmission with respect to block 530. Alternatively, if it is instead determined in block 540 that a change did occur in the underlying transport protocol being used, the routine continues instead to block 545 to complete the receiving of the transmitted HTTP response using the new underlying protocol that has been changed for the remainder of the transmission, and to combine the data received from the transmissions using the different underlying transport protocols. If error encoding or other techniques are used to send redundant data, the operations of blocks 545 and/or 555 may further include attempting to recover or otherwise determine any missing data based on use of those techniques, including to optionally verify that received data is correct (e.g., using parity data). After blocks 545 or 555, the routine continues to block 565 to provide the data that was received in the HTTP response to the requestor for further use, such as for display or other manipulation. As discussed in greater detail with respect to FIG. 4 and elsewhere, when the underlying transport protocol is changed during transmission of an HTTP response, the remaining data that is transmitted using the changed underlying transport protocol may in some embodiments include only new data that was not previously transmitted with respect to the prior underlying transport protocol in use, while in other embodiments and situations at least some of the previously transmitted data may be re-transmitted using the changed underlying transport protocol.

If it is instead determined in block 510 that the request for information received in block 505 is not a request for data from a remote source system, the routine continues instead to block 590 where it performs one or more other indicated operations as appropriate. Such other operations may have various forms in various embodiments and situations, and may include making requests using other than HTTP and/or for other types of data, aggregating data received in multiple related HTTP responses (e.g., for different portions of a Web page, such as in accordance with a page-based algorithm that is in use), etc.

After blocks 565 or 590, the routine continues to block 595 to determine whether to continue, such as until an explicit indication to terminate is received. If it is determined to continue, the routine returns to block 505, and otherwise continues to block 599 and ends.

It will be appreciated that in some embodiments the functionality provided by the routines discussed above may be provided in alternative ways, such as being split among more routines or consolidated into fewer routines. Similarly, in some embodiments, illustrated routines may provide more or less functionality than is described, such as when the amount of functionality that is provided is altered. In addition, while various operations may be illustrated as being performed in a particular manner (e.g., in serial or in parallel) and/or in a particular order, in other embodiments the operations may be performed in other orders and in other manners. Similarly, the data structures discussed above may be structured in different manners in other embodiments, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A configured computing system, comprising:
one or more processors; and
one or more modules with stored instructions that, when executed by at least one of the one or more processors, configure the at least one processor to:
select a streaming transport protocol to use as an underlying transport protocol for a streaming transmission of data to a remote system;
initiate, after the selecting of the streaming transport protocol, the streaming transmission of the data to the remote system using an application layer protocol by streaming the data via the streaming transport protocol selected to be used as the underlying transport protocol;
after a first portion of the data has been transmitted, determine to change to a non-streaming transmission of additional data, including determining to change to a second underlying transport protocol while continuing to use the application layer protocol, the second underlying transport protocol not performing data streaming and being different from the streaming transport protocol; and
initiate, based at least in part on the determining, the non-streaming transmission of the additional data using the application layer protocol and without using data streaming, including transmitting the additional data to the remote system via the second underlying transport protocol without streaming the additional data.

2. The computing system of claim 1 wherein the application layer protocol is SPDY protocol.

3. The computing system of claim 1 wherein the application layer protocol is HyperText Transfer Protocol (HTTP), wherein the selected streaming transport protocol is one of Stream Control Transmission Protocol (STCP) and User Datagram Protocol (UDP), and wherein the initiating of the streaming transmission of the additional data uses HTTP with Transmission Control Protocol (TCP) as the second underlying transport protocol.

4. The computing system of claim 3 wherein the initiating of the streaming transmission of the data includes attempting to transmit multiple HTTP-based communications by streaming data using the selected streaming transport protocol, and wherein the initiating of the non-streaming transmission of the additional data includes re-transmitting, via the second underlying transport protocol, at least one of the multiple HTTP-based communications that is not successfully received by the remote system via the selected streaming transport protocol.

5. The computing system of claim 1 wherein the selecting of the streaming transport protocol is based on information in one or more received requests to which the initiated streaming transmission of the data is a response, on prior configuration corresponding to the remote system, on prior configuration corresponding to one or more groups of data being sent as part of the initiated streaming transmission of the data, or on one or more determined characteristics for data transmissions between the configured computing system and the remote system.

6. The computing system of claim 1 wherein the initiating of the streaming transmission of the data includes sending data packets via a session established between the configured computing system and the remote system.

7. The computing system of claim 1 wherein the selected streaming transport protocol operates without performing error detection for reliability and without performing ordering of transmitted data, and wherein the initiating of the non-streaming transmission of the additional data using the second underlying transport protocol performs error detection for reliability and performs ordering of transmitted data.

8. The computing system of claim 1 wherein the one or more modules include software instructions that, when executed by at least one of the one or more processors, configure the at least one processor to further receive, before the initiating of the streaming transmission of the data, a plurality of requests corresponding to retrieving a Web page for the remote system, and wherein the initiating of the streaming transmission of the data includes concurrently transmitting responses to multiple of the plurality of requests using the selected streaming transport protocol.

9. The computing system of claim 8 wherein the receiving of the plurality of requests occurs using a reliable data channel, and wherein the initiating of the streaming transmission of the data includes using an unreliable data channel that is distinct from the reliable data channel.

10. The computing system of claim 9 wherein the initiating of the non-streaming transmission of the additional data includes using the reliable data channel.

11. The computing system of claim 1 wherein the initiating of the streaming transmission of the data includes using adaptive bitrate streaming to dynamically modify an encoding used for the streaming of the data.

12. The computing system of claim 1 wherein the initiating of the streaming transmission of the data is performed in response to a first request from the remote system for a group of data, and wherein the one or more modules include software instructions that, when executed by the at least one processor, further configure the at least one processor to:

receive a second request from a second remote system for the group of data;
determine to transmit all of the group of data to the second remote system without streaming the data of the group; and
transmit the group of data to the second remote system without streaming the data of the group.

13. A configured computing system, comprising:
one or more processors; and
one or more modules that are configured to:
    initiate a streaming transmission of data to a remote system using an application layer protocol by streaming the data via a selected underlying transport protocol, wherein the application layer protocol is HyperText Transfer Protocol (HTTP), wherein the initiating of the streaming transmission of the data is performed in response to one or more HTTP-based requests from the remote system for one or more indicated groups of data, and wherein the streaming transmission of the data includes one or more HTTP-based responses to the one or more HTTP-based requests that are streamed by HTTP using the selected underlying transport protocol;
    after a first portion of the data has been transmitted, determine to change to a non-streaming transmission of additional data; and
    initiate, based at least in part on the determining, the non-streaming transmission of the additional data using the application layer protocol and without using data streaming,
    and wherein the one or more modules include software instructions that, when executed by at least one of the one or more processors, configure the at least one processor to perform the initiating of the streaming transmission of the data, the determining to change to the non-streaming transmission of the additional data, and the initiating of the non-streaming transmission of the additional data.

14. A non-transitory computer-readable medium having stored computer-executable instructions that, when executed, cause a computing system to:
select a streaming underlying transport protocol to use as a first underlying transport protocol for a streaming transmission of data to a remote system, wherein the selecting is based on prior configuration corresponding to the data or based on one or more determined characteristics for data transmissions between the computing system and the remote system;
initiate, by the computing system and after the selecting of the streaming underlying transport protocol, the streaming transmission of the data to the remote system using an application layer protocol by streaming a first subset of the data via the streaming underlying transport protocol selected to be used as the first underlying transport protocol;
determine, by the computing system, after the first subset of the data has been streamed and based at least in part on one or more identified characteristics of the streaming of the first subset of the data, to change to a non-streaming transmission of an additional second subset of the data using a distinct second underlying transport protocol; and
initiate, by the computing system and based at least in part on the determining, the non-streaming transmission of the additional second subset of the data using the application layer protocol by transmitting the additional second subset of the data via the second underlying transport protocol without using data streaming.

15. The non-transitory computer-readable medium of claim 14 wherein the application layer protocol is HyperText Transfer Protocol (HTTP), wherein the first underlying transport protocol is one of Stream Control Transmission Protocol (STCP) or User Datagram Protocol (UDP) and is used by HTTP to perform the streaming of the first subset of the data, and wherein the second underlying transport protocol is Transmission Control Protocol (TCP) and is used by HTTP to perform the transmitting of the additional second subset of the data.

16. The non-transitory computer-readable medium of claim 14 wherein the stored computer-executable instructions further configure the computing system to, after the first subset of the data has been streamed, re-transmit, via the second underlying transport protocol, at least some of the first subset of the data that is not successfully received by the remote system via the first underlying transport protocol.

17. The non-transitory computer-readable medium of claim 14 wherein the initiating of the streaming transmission of the data includes using an unreliable data channel and is performed in response to a request received from the remote system that is made using a reliable data channel that is distinct from the unreliable data channel, and wherein the initiating of the non-streaming transmission of the additional second subset of the data includes using the reliable data channel.

18. A computer-implemented method comprising:
receiving, by a configured server computing system, one or more requests from a client system for one or more groups of data, the one or more requests being made using HyperText Transfer Protocol (HTTP);
selecting, by the configured server computing system, a streaming protocol to use as an underlying transport protocol for multiple HTTP-based responses to be sent for the received one or more requests, the multiple HTTP-based responses including the one or more groups of data;
transmitting, by the configured server computing system, at least one of the multiple HTTP-based responses by streaming data for the at least one HTTP-based response to the client system using the selected streaming protocol;
determining, by the configured server computing system and based at least in part on the transmitting of the at least one HTTP-based response, to change to a different underlying transport protocol for transmitting one or more of the multiple HTTP-based responses without performing data streaming; and
transmitting, by the configured server computing system and in response to the determining, the one or more HTTP-based responses to the client system using the different transport protocol and without streaming data for the one or more HTTP-based responses.

19. The computer-implemented method of claim 18 wherein the selected streaming protocol is one of Stream Control Transmission Protocol (STCP) and User Datagram Protocol (UDP) and is used by HTTP to perform the streaming of the data for the at least one HTTP-based response, and wherein the different underlying transport protocol is Transmission Control Protocol (TCP) and is used by HTTP to perform the transmitting of the one or more HTTP-based responses.

20. The computer-implemented method of claim 18 wherein the selecting of the streaming protocol to use is based on information in the received one or more requests or on prior configuration corresponding to the client system.

21. The computer-implemented method of claim 18 wherein the determining to change to the different underlying transport protocol includes monitoring performance of the streaming of the data for the at least one HTTP-based response and includes, after the data for the at least one HTTP-based response has been streamed, determining that one or more defined criteria for streaming data are not satisfied.

22. The computer-implemented method of claim 18 wherein the one or more requests are received using a reliable data channel that performs error detection for reliability, wherein the transmitting of the at least one HTTP-based response is performed using a distinct unreliable data channel that does not perform error detection for reliability, and wherein the transmitting of the one or more HTTP-based responses is performed using the reliable data channel.

* * * * *